United States Patent Office 2,743,272
Patented Apr. 24, 1956

2,743,272

SENSITIZING DYES CONTAINING A 4-ARYL-5-ARYLOXY- OR 5-ARYLTHIOTHIAZOLE NUCLEUS

Edward B. Knott, Harrow, England, assignor to Eastman Kodak Company, Rochester, N. Y., a corporation of New Jersey No Drawing. Application March 28, 1952, Serial No. 279,209

13 Claims. (Cl. 260—240.1)

This invention relates to new polymethine dyes which are useful in optically sensitizing photographic silver halide emulsions and to methods for preparing such dyes.

The new polymethine dyes of my invention contain a 4-aryl-5-aryloxythiazole or 4-aryl-5-arylthiothiazole nucleus. I have prepared dyes of the cyanine, carbocyanine, hemicarbocyanine, styryl, merocyanine, complex (trinuclear) merocyanine, and complex (trinuclear) cyanine classes containing such nuclei. This application is directed primarily to dyes of the merocyanine, complex merocyanine, and complex cyanine classes.

The merocyanine dyes of my invention comprise the merocarbocyanine dyes selected from those represented by the following general formula:

I.

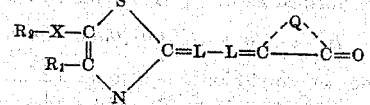

wherein R represents an alkyl group, such as methyl, ethyl, β-hydroxyethyl, etc., $R_1$ and $R_2$ each represents an aryl group, such as phenyl, o-, m-, and p-chlorophenyl, o-, m-, and p-tolyl, o-, m-, and p-methoxyphenyl, o-, m-, and p-bromophenyl, o-, m-, and p-hydroxyphenyl, α- and β-naphthyl, etc., X represents an oxygen or sulfur atom, L represents a methine group (e. g. =CH—, =C.CH$_3$—, =C.C$_2$H$_5$—, etc.), and Q represents the non-metallic atoms necessary to complete a heterocyclic nucleus containing five atoms in the heterocyclic ring, three of said atoms being carbon atoms, one of said atoms being a nitrogen atom and one of said atoms being selected from the group consisting of an oxygen atom and a sulfur atom.

The merocarbocyanine dyes represented by Formula I above can advantageously be prepared by condensing a compound selected from these represented by the following general formula:

II.

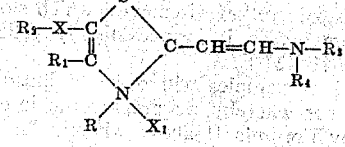

with a ketomethylene compound selected from those represented by the following general formula:

III.

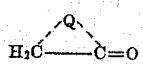

wherein R, $R_1$, $R_2$, X, and Q have the values given above, $R_3$ represents a hydrogen atom or an acyl group (e. g. acetyl, propionyl, benzoyl, etc.), $R_4$ represents an aryl group (e. g. phenyl, o-, m-, and p-tolyl, etc.), and $X_1$ represents an acid radical, such as chloride, bromide, iodide, benzenesulfonate, p-toluenesulfonate, methylsulfate, ethylsulfate, perchlorate, thiocyanate, etc. The acylated compounds (i. e. where $R_3$ is acyl) are preferred for dye condensations.

The condensation of the compounds of Formula II with those of Formula III can be accelerated by heat and can be performed in the presence of an inert diluent, if desired (e. g. lower aliphatic alcohol, such as ethanol, n-butanol, etc.) acetone, pyridine, etc.

The compounds of Formula II above can advantageously be prepared according to the method described in U. S. Patent 2,487,882, issued November 15, 1949. Such a method comprises reacting a quaternary salt selected from those represented by the following general formula:

IV.

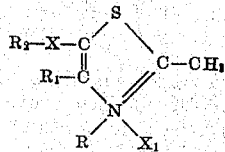

wherein R, $R_1$, $R_2$, X, and $X_1$ have the values given above with a compound selected from those represented by the following general formula:

V. $\qquad R_4—N=CM—OR_5$ wherein $R_4$ has the values given above and $R_5$ represents an alkyl group, such as methyl, ethyl, etc. Compounds represented by Formula V can be prepared by the method of Lande (J. C. S. 1903, vol. 83, 417). (See U. S. Patent 2,487,882.) The acylated compounds of Formula II can be prepared by heating the compounds wherein $R_3$ represents a hydrogen atom in the presence of a carboxylic anhydride.

The compounds represented by Formula IV above can advantageously be prepared by condensing a halogenated ketonyl ether or halogenated ketonyl thioether selected from those represented by the following general formula:

VI.

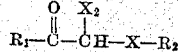

wherein $R_1$, $R_2$, and X have the values given above and $X_2$ represents a halogen atom (e. g. chlorine, bromine, etc.) with thioacetamide. The compounds represented by Formula VI can be prepared by halogenating a ketone selected from those represented by the following general formula:

VII.

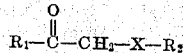

wherein $R_1$, $R_2$, and X have the values given above. The halogenations can advantageously be carried out in the presence of an inert solvent, such as carbon bisulfide, chloroform, carbon tetrachloride, etc. A number of ω-aryloxyacetophenones of Formula VII have been described by Moehlau, "Berichte," vol. 15 (1882), pg. 2497. A number of ω-arylthioacetophenones of Formula VII have been described by Delisle, "Berichte," vol. 22 (1889), 309. The conventional Williamson ether synthesis was employed in my invention to produce the ketonyl ethers and ketonyl thioether.

*ω-Aryloxyacetophenones.*—These were prepared as follows:

Potassium hydroxide (1 mol.) was dissolved in industrial methanol (750 cc.) by heating on a steam bath. The required phenol (1 mol.) was then added and the solution cooled to 30° C. The addition of the required phen- (or naphth-) acylbromide (1 mol.) with efficient agitation caused a temperature increase (to about 40–45° C.) and separation of potassium bromide. On standing for one hour followed by chilling, the required ω-aryloxyacetophenone then separated. It was collected, washed with a little ice-cold ethanol and water until all soluble bromide was removed. Alternatively it was recrystallized from ethanol. The following table gives the properties of representative ω-aryloxyacetophenones obtained in the above manner.

TABLE I

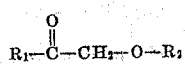

| $R_1$ | $R_2$ | Percent Yield | M.P., °C | Appearance |
|---|---|---|---|---|
| $C_6H_5-$ | $C_6H_5-$ | 77 | 72 | white needles. |
| p-$CH_3O-C_6H_4-$ | $C_6H_5-$ | 72 | 65 | small plates. |
| $C_6H_5-$ | p-(t-$C_8H_{17}$)$C_6H_4-$ | 50 | 76–76.5 | flat needles. |
| p-$CH_3-O-C_6H_4-$ | p-(t-$C_8H_{17}$)$C_6H_4-$ | 90 | 102 | waxy plates. |
| $C_6H_5-$ | p-$C_6H_5$·$C_6H_4-$ | 65 | 94 | flakes. |
| p-Cl-$C_6H_4-$ | p-Cl-$C_6H_4-$ | 52 | 132–133 | glossy needles. |
| 3,4-$(CH_3O)_2C_6H_3-$ | p-$C_2H_5O-C_6H_4-$ | 70 | 103 | threads. |
| p-Br-$C_6H_4-$ | p-Br-$C_6H_4-$ | 63 | 133–135 | laths. |

*ω-Bromo-ω-aryloxyacetophenones.*—The ω-aryloxyacetophenones (1 mol.) obtained above were dissolved in carbon bisulfide or chloroform (1 liter) and were treated at 5° C. (or higher, e. g. 50–60° C., if reaction was slower) with a solution of bromine (1 mol.) in the same solvent (250 cc.). The bromo-ketone was isolated either by evaporation of the solvent by air or by washing with dilute aqueous sodium carbonate, then water, and removing the solvent on the steam bath under reduced pressure. The resultant solids or oils were unstable and used in most cases without purification. Following are the constants of several brominated ketones which were purified:

1. ω-Bromo-ω-phenoxyacetophenone, needles, M. P. 72° C. from light petroleum.
2. ω-Bromo-p-methoxy-ω-phenoxyacetophenone, crystalline balls, M. P. 80–81° C. from ligroin.
3. ω-Bromo-p-chloro-ω-(p-chlorophenoxy) acetophenone, plates, M. P. 158° C. from ethanol.
4. ω,p-dibromo-ω-(p-bromophenoxy) acetophenone, needles, M. P. 157° C. from ethanol.

*4-aryl-5-aryloxy-2-methylthiazoles.*—These were prepared as follows:

The bromo-ketones (1 mol.) obtained above were dissolved or suspended in ethanol (500 cc.) and thioacetamide (1.1 mol.) added at 30° C. There usually was a temperature rise, and after this had subsided, the mixture was heated at 60–70° C. and allowed to cool. In some cases there was some spontaneous crystallization of the hydrobromide salt of the free thiazole, and in all cases anhydrous ether (2 liters) was added to throw the salt completely out of solution. It was collected, and if sticky, was slurried with acetone, collected and washed with acetone. The base was obtained by dissolving the salt in ethanol, adding excess aqueous sodium carbonate and throwing out with water. It was usually crystallized from ethanol. The following table gives the constants of several of the thiazole bases thus obtained.

TABLE II

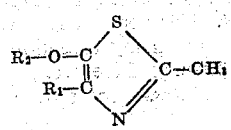

| $R_1$ | $R_2$ | Percent Yield | M.P., °C | Appearance |
|---|---|---|---|---|
| $C_6H_5-$ | $C_6H_5-$ | 59 | 63 | Hard Aggregates. |
| p-$CH_3-O-C_6H_4-$ | $C_6H_5-$ | 64 | 90 | Needles. |
| p-$CH_3-O-C_6H_4-$ | p-(t-$C_8H_{17}$)$C_6H_4-$ | 34 | 65–72 | Plates. |
| $C_6H_5-$ | p-($C_6H_5$)$C_6H_4-$ | 21 | 97–98 | Needles. |
| 3,4-$(CH_3O)_2-C_6H_3-$ | p-($C_2H_5O$)$C_6H_4-$ | 25 | 71–72 | Soft Needles. |
| p-Cl-$C_6H_4-$ | p-Cl-$C_6H_4-$ | 33 | 100–101 | Rhombic. |
| p-Br-$C_6H_4-$ | p-Br-$C_6H_4-$ | 59 | 76–77 | Laths. |

The quaternary salts of Formula IV wherein X represents an oxygen atom were prepared by heating the above thiazole bases (Table II) together with an alkyl salt.

*ω-Arylthioacetophenones, ω-bromo-ω-arylthioacetophenones, and 4-aryl-5-arylthio-2-methylthiazoles.*—These intermediates were prepared in the same manner as the corresponding aryloxy compounds described above. The following examples will serve to illustrate this general procedure.

*Example A.—ω-p-Tolylthioacetophenone*

Potassium hydroxide (43.5 g.) was dissolved in industrial methylated spirit (400 cc.) and p-thiocresol (96.2 g.) added. To the solution at 30° C. was added phenacyl bromide (155 g.) and the whole well agitated. Potassium bromide separated and the temperature rose to 60° C. After 30 minutes the whole was chilled and the oil which separated rapidly crystallized. Water (400 cc.) was added and the crystals collected, washed with water then with a little ethanol. Yield 185 g. (98.5%). A sample from ethanol formed short, glassy needles, M. P. 40° C.

*Example B.—ω-Bromo-ω-p-tolylthioacetophenone*

The crude ω-p-tolylthioacetophenone (24.2 g.) was dissolved in chloroform (100 cc.) and cooled to 10° C. A solution of bromine (5.15 cc.) in chloroform (2.5 cc.) was dripped into the above over 15 minutes. Bromine absorption was rapid.

The chloroform was removed in an air stream to give 30 g. of yellow crystals, M. P. 77° C. A sample from ethanol formed white needles, M. P. 79–81° C.

*Example C.—2-methyl-4-phenyl-5-p-tolylthiothiazole*

ω-Bromo-ω-p-tolylthioacetophenone (30 g.), thioacetamide (10 g.) and ethanol (20 cc.) were warmed gently until reaction set in as shown by a rise in temperature to 60° C. The whole was refluxed for 1 hour, chilled and dry ether (500 cc.) added. The required hydrobromide (25.2 g.) was collected. A further 5 g. of salt was obtained on saturating the filtrate with hydrogen chloride gas. The combined salts were washed with acetone, dissolved in hot spirit (250 cc.) and the base thrown down by adding aqueous 2N sodium carbonate. The oil was extracted with ether, dried over sodium sulphate and the ether distilled. The residual oil was distilled at 200° C./6 mm. to give a pale yellow viscous oil which slowly crystallized. From ligroin it formed slightly yellow glassy prisms, M. P. 41–42° C.

The following examples will serve to illustrate more fully the manner whereby we prepare the intermediates represented by Formula II above wherein $R_3$ represents a hydrogen atom.

*Example 1.—2 - β - anilinovinyl - 5 - phenoxy - 4 - phenylthiazole ethiodide*

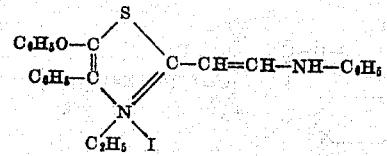

2-methyl-5-phenoxy-4-phenylthiazole (5.34 g.) and ethyl-p-toluene-sulphonate (4 g.) were fused at 170° C. for 5 hours. Ethylisoformanilide (3 cc.) was added and the fusion continued for 1 hour. Ethanol (15 cc.) was added to dissolve the red melt and an excess of saturated aqueous potassium iodide added. The addition of ether (25 cc.) threw out a red oil which slowly crystallised. It was collected, washed with water and boiled up with ethanol (25 cc.). The reddish crystals (3.3 g.) were pure enough for dye condensations. A sample from ethanol formed yellow needles M. P. 196° C.

*Example 2.—2 - β - anilino - 5 - phenoxy - 4 - phenylthiazole metho-p-toluenesulphonate*

This intermediate was obtained similarly after fusing the base (1.4 g.) and methyl-p-toluenesulphonate (1 g.) at 150° C. for 90 minutes. Ethylisoformanilide (1 cc.) was added and the fusion at 150° C. continued. The solidified melt formed soft yellow needles, M. P. 191° C., from ethanol.

*Example 3.—2 - β - anilinovinyl - 5 - p - (t - octyl)phenoxy-4-phenylthiazole ethiodide*

This intermediate formed as yellow needles, M. P. 176° C. from benzene-ethanol.

*Example 4.—2 - β - anilino - 4 - p - anisyl - 5 - phenoxythiazole ethiodide*

The base (1.5 g.) and ethylsulphate (0.7 cc.) were fused at 150° C. for 90 minutes. Ethylisoformanilide (1 cc.) was added and the fusion at 150° C. continued for 30 minutes. It was converted to the iodide and formed yellow needles, M. P. 196° C., from ethanol.

*Example 5.—2 - β - anilino - 4 - p - anisyl - 5 - phenoxythiazole metho-p-toluenesulphonate*

This intermediate formed as yellow needles, M. P. 202° C., from ethanol.

*Example 6.—2 - β - anilinovinyl - 4 - p - anisyl - 5 - p - (t-octyl)phenoxythiazole metho-p-toluenesulphonate*

This intermediate formed as pale yellow needles, M. P. 236° C., from ethanol.

*Example 7.—2 - β - anilinovinyl - 4 - phenyl - 5 - p - phenylphenoxythiazole methiodide*

This intermediate formed as yellow powder, M. P. 266° C., after boiling up with acetone.

*Example 8.—2 - β - anilinovinyl - 5 - p - chlorophenoxy - 4-p-chlorophenylthiazole ethiodide*

This intermediate formed as yellow-brown crystals, M. P. 247° C., from ethanol.

*Example 9.—2 - β - anilinovinyl - 4 - (3,4 - dimethoxyphenyl)5-p-phenetoxythiazole ethiodide*

This intermediate formed as soft, glossy, yellow needles, M. P. 185° C., from ethanol.

*Example 10.—2 - β - anilinovinyl - 5 - p - bromophenoxy - 4-p-bromophenylthiazole ethiodide*

This intermediate formed as brown crystals, M. P. 193° C., from ethanol.

*Example 11.—2-β-anilinovinyl-4-phenyl-5-p-tolylthiothiazole ethiodide*

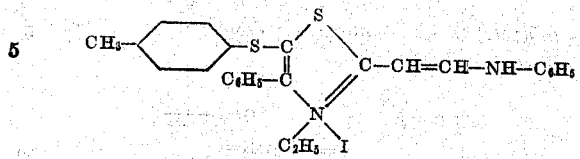

2 - methyl - 4 - phenyl - 5 - p - tolylthiothiazole (9 g.) and ethylsulphate (4 cc.) were fused at 150° C. for 2 hours. Ethylisoformanilide (5 cc.) was added and fused a further hour at 150° C. Treated as Ex. 1, the iodide (9.5 g., 56.5%) formed a yellow powder, M. P. 225° C., from ethanol.

*Example 12.—2 - β - anilinovinyl - 4 - phenyl - 5 - p - tolylthiothiazole methiodide*

This intermediate formed as glossy, yellow needles, M. P. 243° C., from methanol.

*Example 13.—2 - β - anilinovinyl - 4 - β - naphthyl - 5 - p-tolylthiothiazole ethiodide*

This intermediate formed as fine, yellow needles, M. P. 234° C., from methanol.

The above intermediates (Examples 1 to 13) were readily acylated to give compounds of Formula II ($R_3$=acyl) by refluxing in a carboxylic anhydride (e. g., acetic anhydride) for 30 minutes. These acylated intermediates were used in preparing the merocyanine dyes described in the following examples.

*Example 14.—[3 - ethyl - 5 - phenoxy - 4 - phenyl - 2 - thiazole] [3 - ethyl 2 - thio - 5 - thiazolid - 4 - one] dimethinemerocyanine*

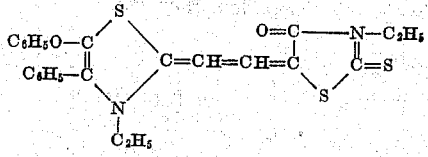

Product of Ex. 1 (2.63 g.) and acetic anhydride (15 cc.) were refluxed for ½ hour and the solvents removed under reduced pressure. 3-ethylrhodanine (0.8 g.), ethanol (10 cc.) and triethylamine (1 cc.) were added and the whole heated on the steam bath for 10 minutes. An oil separated on cooling which crystallized overnight. From ethanol it forms green needles M. P. 174° C. It sensitizes a silver chlorobromide or iodobromide emulsion with a peak of 610 mu.

*Example 15.—[4 - p - anisyl - 3 - methyl - 5 - phenoxy - 2 - thiazole] [2 - ethylthio - 4 - thiazol - 5 - one] dimethinemerocyanine*

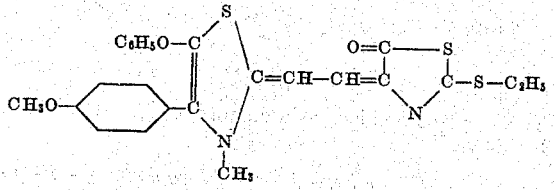

N-dithiocarbethoxyglycine (2 g.), acetic anhydride (15 cc.) and ethyl orthoformate (5 cc.) were heated on the steam bath for 30 minutes and the solvents removed. 4-β-anisyl-2-methyl-5-phenoxythiazole (3.0 g.) and ethyl p-toluenesulphonate (2.1 g.) were fused at 170° C. for 5 hours and the resulting melt washed into the above crude 2-ethylthio-4-ethoxymethylenethiazol-5-one with ethanol (15 cc.). Triethylamine (1.5 cc.) was added and the whole heated on the steam bath for 5 minutes. On cooling an oil separated. Methanol (10 cc.) was added and on boiling the dye crystallized. From benzene-methanol it formed dark red needles with green reflex, M. P. 168° C. It sensitized a silver chlorobromide with a peak at 580 mu.

In a manner similar to that illustrated in Examples 14 and 15, the following merocyanine dyes were prepared.

*Example 16.*—[4 - p - anisyl - 3 - ethyl - 5 - phenoxy - 2 - thiazole] [2 - ethylthio - 4 - thiazol - 5 - one] dimethinemerocyanine.

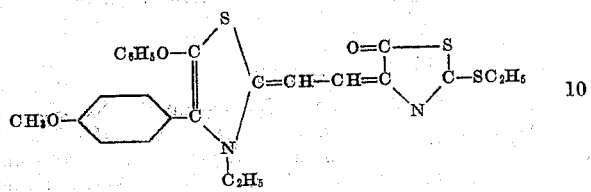

This dye was obtained as purple needles from benzene-methanol melting at 164° C. It sensitized a photographic gelatin silver chlorobromide emulsion at 580 mu max. and silver bromiodide emulsion at 580 mu max.

*Example 17.*—[4 - p - anisyl - 3 - ethyl - 5 - phenoxy - 2 - thiazole] [3 - ethyl - 2 - thio - 5 - thiazolid - 4 - one] dimethinemerocyanine

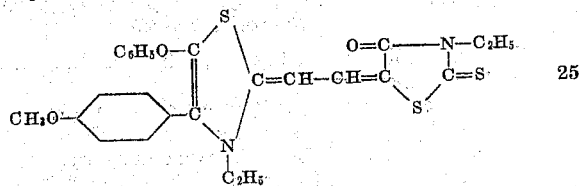

This dye was obtained as purple needles from benzene-methanol, M. P. 150° C., with maxima at 620 mu (AgClBr) and 610 mu (AgIBr).

*Example 18.*—[4 - p - anisyl - 3 - methyl - 5 - p - (t - octyl)phenoxy - 2 - thiazole] [3 - ethyl - 2 - thio - 5 - thiazolid-4-one] dimethinemerocyanine

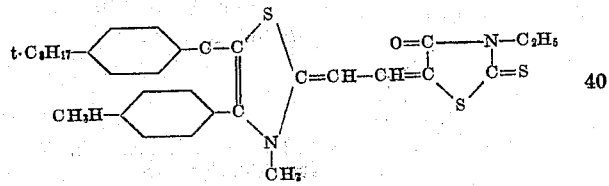

This dye was obtained as red crystals from benzene-methanol, M. P. 161° C., with maxima at 610 mu (AgClBr) and 600 mu (AgIBr).

*Example 19.*—[4 - p - anisyl - 3 - methyl - 5 - p - (t - octyl)phenoxy - 2 - thiazole] [2 - ethylthio - 4 - thiazol - 5-one] dimethinemerocyanine

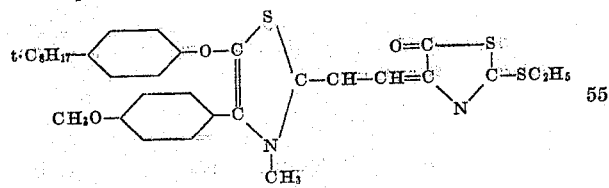

This dye was obtained as a gummy solid, and no M. P. determined.

*Example 20.*—[3 - ethyl - 5 - p - chlorophenoxy - 4 - p - chlorophenyl - 2 - thiazole] [3 - ethyl - 2 - thio - 5 - thiazolid - 4 - one] dimethinemerocyanine

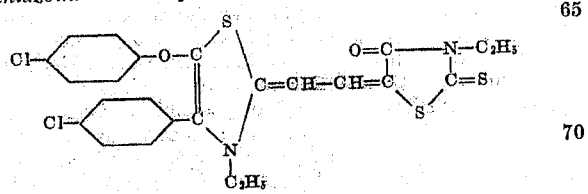

This dye was obtained as violet needles from benzene-methanol, M. P. 194° C., with maxima at 600 mu (AgClBr) and 595 (AgIBr).

*Example 21.*—[3 - ethyl - 5 - p - bromophenoxy - 4 - p - bromophenyl - 2 - thiazole] [2 - ethylthio - 4 - thiazolid - 5-one] dimethinemerocyanine

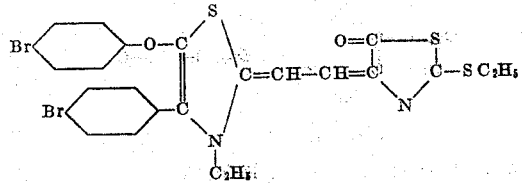

This dye was obtained as green needles, M. P. 149° C., with a maximum at 580 mu (AgClBr and AgIBr).

*Example 22.*—[3 - ethyl - 4 - phenyl - 5 - p - tolylthio - 2 - thiazole] [3 - ethyl - 2 - thio - 5 - thiazolid - 4 - one] dimethinemerocyanine

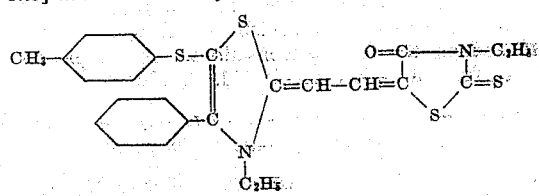

This dye was obtained as bronze flakes, M. P. 165° C., with maxima at 630 mu (AgClBr), and 570 and 620 (AgIBr).

*Example 23.*—[3 - ethyl - 4 - phenyl - 5 - p - tolylthio - 2 - thiazole] [2 - ethylthio - 4 - thiazol - 5 - one] dimethinemerocyanine

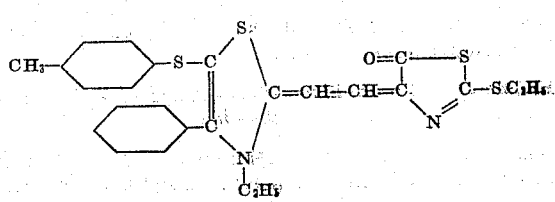

This dye was obtained as a gummy solid and its M. P. was not determined.

*Example 24.*—[3 - methyl - 4 - phenyl - 5 - p - tolylthio - 2 - thiazole] [2 - ethylthio - 4 - thiazol - 5 - one] dimethinemerocyanine

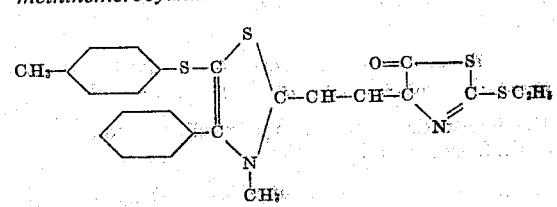

This dye was obtained as blue-green needles from benzene-methanol, M. P. 133° C., with maxima at 590 mu (AgClBr and AgIBr).

*Example 25.*—[3 - methyl - 4 - β - naphthyl - 5 - p - tolylthio - 2 - thiazole] [2 - ethylthio - 4 - thiazol - 5 - one] dimethinemerocyanine

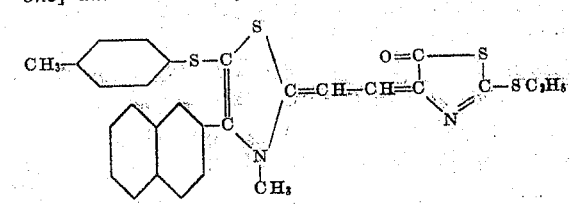

This dye was obtained as violet rosettes from benzene-methanol, M. P. 180° C., with maxima at 590 mu (AgClBr and AgIBr).

*Example 26.*—[3 - Ethyl - 4 - β - naphthyl-5-p-tolylthio-2-thiazole] [3-ethyl-2-thio-5-thiazolid-4-one] dimethine-merocyanine

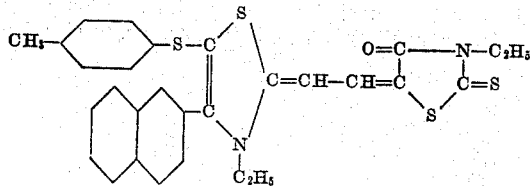

This dye was obtained as garnet needles from benzene-methanol, M. P. 198° C., with maxima at 630 mu (AgClBr) and 610 mu (AgIBr).

Cyanine (monomethine) and carbocyanine (trimethine) dyes can also be obtained according to my invention. Such dyes can advantageously be obtained by condensing a quaternary salt selected from those represented by Formula IV with a compound selected from those represented by the following general formula:

VIII.

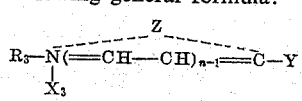

wherein R₃ represents an alkyl group, such as methyl, ethyl, n-propyl, β-hydroxyethyl, β-ethoxyethyl, etc., X₃ represents an acid radical, such as chloride, bromide, iodide, methylsulfate, ethylsulfate, benzenesulfonate, p-toluenesulfonate, perchlorate, etc., n represents a positive integer of from 1 to 2, Y represents an electro-negative group, such as chloride, bromide, alkylthio (e. g., methylthio, ethylthio, etc.), arylthio (e. g., phenylthio, p-tolylthio, etc.), a β-arylaminovinyl group (e. g., β-acetanilidovinyl, etc.), etc., and Z represents the nonmetallic atoms necessary to complete a heterocyclic nucleus containing from 5 to 6 atoms in the heterocyclic ring, such as those of the thiazole series (e. g. thiazole, 4-methylthiazole, 5 methylthiazole, 4- phenylthiazole, 5-phenylthiazole, 4,5 - dimethylthiazole, 4,5 - diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6 - methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5- methoxy-β-naphthothiazole, 5-ethoxy-β-naphthothiazole, 7-methoxy-α-naphthothiazole, 8-methoxy-α-naphthothiazole, etc.), those of the thionaphtheno-7', 6', 4, 5-thiazole series (e. g. 4'-methoxy-thionaphtheno-7', 6', 4, 5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5 - phenyloxazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8- chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5 - trimethylindolenine, 3,3,7 - trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc.

The following samples will serve to illustrate the manner whereby I prepare the cyanine and carbocyanine dyes mentioned above.

*Example 27.*—[1 - methyl-2-quinoline] [-ethyl - 5 - phenoxy-4-phenyl-2-thiazole] methinecyanine iodide

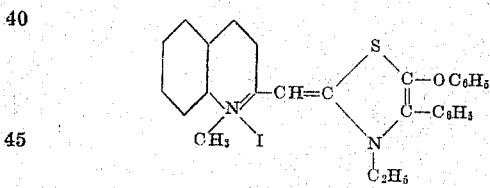

2-methyl-5-phenoxy-4-phenylthiazole (0.5 g) and diethylsulphate (0.3 g.) were fused at 150° C. for 1 hour. 2-methylthioquinoline metho-p-toluenesulphonate (0.62 g.), ethanol (10 cc.) and triethylamino (0.3 cc.) were added and refluxed for 15 minutes on the steam bath. A saturated solution of potassium iodide (1 cc.) was added and on cooling, the dye crystallized. From ethanol it formed orange threads, M. P. 258° C. It sensitized a silver chlorobromide emulsion with a peak at 540 mu.

*Example 28.*—Bis-(4-p-anisyl - 3 - methyl - 5 - phenoxy-2-thiazole) trimethinecyanine perchlorate

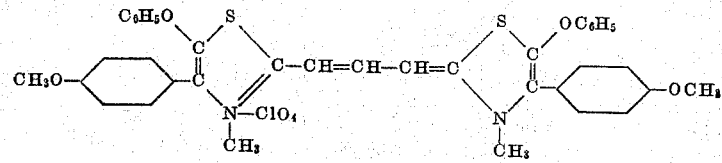

Product of Ex. 5 (1.5 g.) and acetic anhydride (10 cc.) were refluxed for 30 minutes and the solvent removed under reduced pressure. 4-p-anisyl-2-methyl-5-phenoxy-thiazole (0.75 g.) and methyl p-toluenesulfonate (0.5 g.) were fused at 150° C. for 90 minutes and the resulting quaternary salt combined with the first product and refluxed for 5 minutes in ethanol (10 cc.) and triethylamine (0.5 cc.). Saturated aqueous potassium iodide (1 cc.) was added and the dye obtained as a tar on cooling. The liquor was decanted, the tar dissolved in ethanol (15 cc.) and an excess of saturated aqueous sodium perchlorate added. The dye separated and formed a bronze crystalline powder, M. P. 140° C., from methanol. It sensitized a silver chlorobromide emulsion with a peak at 540 mu and a silver iodobromide with a peak at 610 mu.

*Example 29.—Bis-(3-methyl-4-phenyl-5-p-tolylthio-2-thiazole)trimethinecyanine iodide*

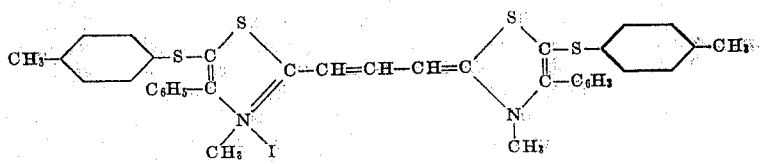

This dye was obtained as flat, bronze needles, M. P. 224° C., from ethanol. It sensitized a gelatino silver chlorobromide emulsion with a maximum at 640 mu.

*Example 30.—[1-ethyl-2-quinoline] [3-methyl-4-phenyl-5-p-tolythio-2-thiazole]methinecyanine iodide*

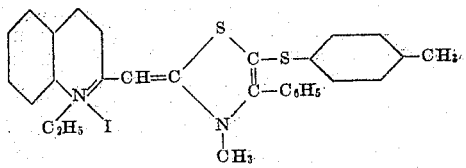

This dye was obtained as glossy, red needles, M. P. 228° C., from methanol. It sensitized a silver chlorobromide emulsion with a maximum at 540 mu.

*Example 31.—Bis-(3-ethyl-4-β-naphthyl-5-p-tolylthio-2-thiazole)trimethinecyanine iodide*

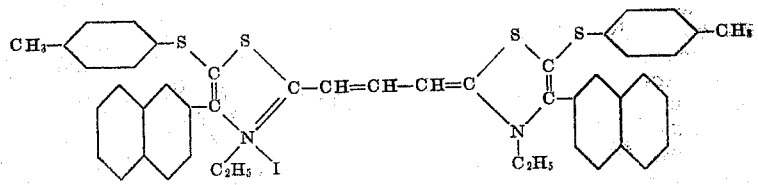

This dye was obtained as bronze prisms, M. P. 194° C., from methanol. It sensitized a silver chlorobromide emulsion with a maximum at 630 mu.

The following styryl dye was also obtained.

*Example 32.—p-Dimethylaminostyryl-4-β-naphthyl-5-p-tolylthio-2-thiazole ethoperchlorate*

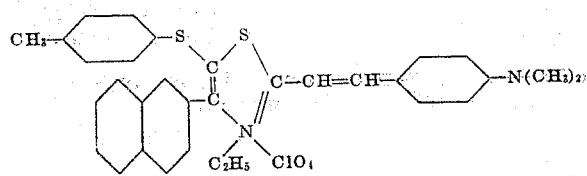

2-methyl-4-β-naphthyl-5-p-tolylthiothiazole (0.7 g.) and diethylsulphate (0.3 cc.) were fused at 140° C. for 90 minutes. p-Dimethylaminobenzaldehyde (0.3 g.), ethanol (10 cc.) and piperidine (0.1 cc.) were added and the whole refluxed for 30 minutes. Saturated aqueous sodium perchlorate (0.5 cc.) was added and the dye crystallized on standing. From methanol it formed dull red crystals, M. P. 186° C. It sensitized a silver chlorobromide emulsion with a peak at 580 mu.

As shown in the above examples the condensations can be accelerated by heating in the presence of a basic-condensing agent, such as triethylamine, tri-n-butylamine, triisoamylamine, N-methylpiperidine, etc. An inert solvent, such as ethanol, n-butanol, 1,4-dioxane, etc. can be used, if desired.

The merocarbocyanine dyes of the types represented by Examples 14 to 26 above can be heated together with an alkyl salt, such as methyl p-toluenesulfonate, ethyl p-toluenesulfonate, methylsulfate, ethylsulfate, etc. to give dyes of the types represented by the following general formulas:

IX.

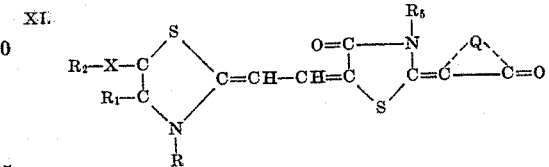

and

X.

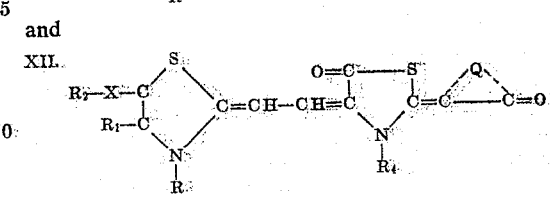

wherein R, $R_1$, $R_2$ and X have the values given above, $R_4$ and $R_5$ each represents an alkyl group, such as methyl, ethyl, etc., and $X_4$ represents an acid radical, such as p-toluenesulfonate, ethylsulfate, methylsulfate, etc.

The dyes of Formulas IX and X can be condensed with one of the ketomethylene compounds selected from those represented by Formula III to give complex (trinuclear) merocyanine dyes represented by the following general formulas:

XI.

and

XII.

wherein R, $R_1$, $R_2$, $R_4$, $R_5$, X and Q have the values given above. Alternatively, the dyes of Formulas IX and X can be condensed with a cyclammonium quaternary salt selected from those represented by the following general formula:

XIII.

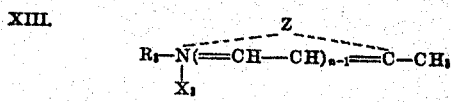

wherein R₃, X₃, n, and Z have the values given above, to produce complex (trinuclear) cyanine dyes represented by the following general formulas:

XIV.

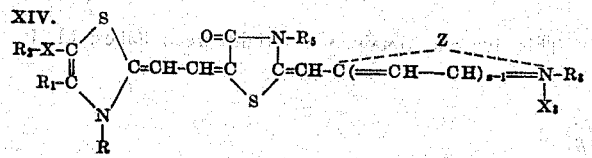

and

XV.

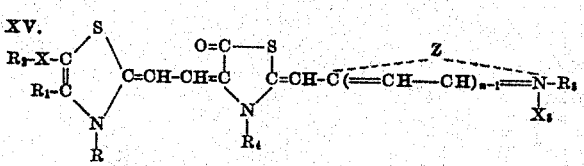

wherein R, R₁, R₂, R₃, R₄, R₅, X, X₃, n, and Z have the values given above. These condensations are accelerated by heating in the presence of a basic condensing agent, such as triethylamine, tri-n-butylamine, triisoamylamine, N - methylpiperidine, N - ethylpiperidine, N,N - dimethylaniline, N,N-diethylaniline, etc. Inert diluents, such as ethanol, isopropanol, propanol, n-butanol, acetone, 1,4-dioxane, etc., can be used.

The following examples will serve to illustrate the manner whereby I prepare the novel complex merocyanine and cyanine dyes of my invention.

*Example 33.*—[3 - ethyl - 5 - phenoxy - 4 - phenyl - 2-thiazole] [2 - (3 - ethyl - 4 keto - 2 - thio - 5 - thiazolidinylidene) - 3 - ethyl - 5 - thiazolid - 4 - one]dimethinemerocyanine

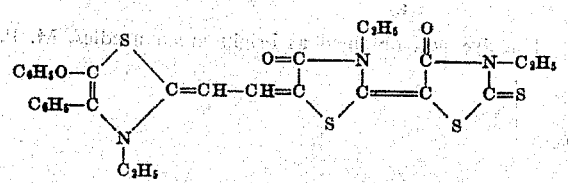

Product of Ex. 14 (0.75 g.) and methyl p-toluenesulphonate (0.3 g.) were fused at 120° C. for 1 hour. 3-ethylrhodanine (0.3 g.), ethanol (10 cc.) and triethylamine (0.3 cc.) were added and the whole heated for 10 minutes on the steam bath. The dye separated, was filtered hot and washed with ethanol. From benzene it formed green crystals, M. P. 274° C. It sensitized a silver chlorobromide emulsion with a peak at 670 mu and a silver iodobromide emulsion with a broad maximum at 630–670 mu.

*Example 34.*—[4-p-anisyl-3-methyl-5-phenoxy-2-thiazole] [2-(3-ethyl-4-keto-2-thio - 5 - thiazolidinylidene) - 3-ethyl-5-thiazolid-4-one] dimethinemerocyanine

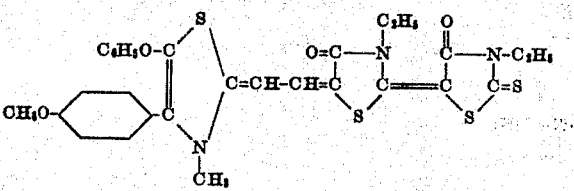

This dye was obtained as a green powder, M. P. 240° C., from pyridine-methanol with sensitizing maxima at 690 mu (AgClBr) and 680 mu (AgBrI).

*Example 35.*—[4-p-anisyl-3-methyl-5-phenoxy-2-thiazole] [2-(3-ethyl-4-keto-2-thio - 5 - thiazolidinylidene)-3-methyl-4-thiazolid-5-one] dimethinemerocyanine

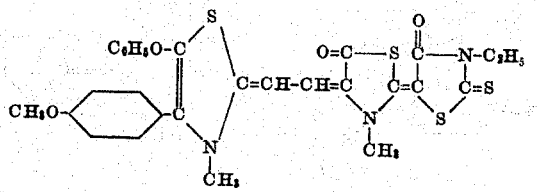

This dye was obtained as green crystals, M. P. 286° C., from pyridine with a sensitizing maximum at 670 mu (AgClBr).

*Example 36.*— [4-p-anisyl-3-ethyl-5-phenoxy-2-thiazole] [2-(3-ethyl-4-keto-2-thio - 5 - thiazolidinylidene)-3-ethyl-5-thiazolid-4-one] dimethinemerocyanine

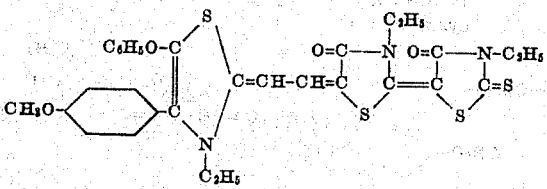

This dye was obtained as coppery crystals, M. P. 278° C., from pyridine methanol with sensitizing maxima at 680 mu (AgClBr and AgIBr).

*Example 37.* — [4-p-anisyl-3-ethyl-5-phenoxy-2-thiazole] [2-(3 - ethyl - 4 - keto-2-thio-5-oxazolidinylidene)-3-ethyl-5-thiazolid-4-one] dimethinemerocyanine

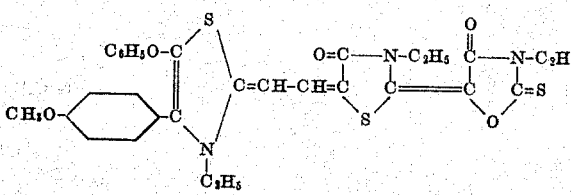

This dye was obtained as dark green needles, M. P. 296° C., from pyridine-methanol with sensitizing maxima at 650 mu (AgClBr) and 640 mu (AgIBr).

*Example 38.* — [4-p-anisyl-3-ethyl-5-phenoxy-2-thiazole] [2-(3-ethyl-keto-2-thio - 5 - thiazolidinylidene) - 3-methyl-4-thiazolid-5-one] dimethinemerocyanine

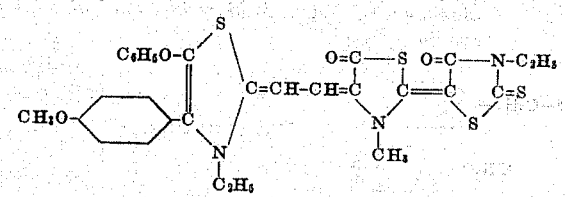

This dye was obtained as dark green needles, M. P. 253° C., from pyridine-methanol with sensitizing maxima at 690 mu (AgClBr) and 680 mu (AgIBr).

*Example 39.* — [4-p-anisyl-3-ethyl-5-phenoxy-2-thiazole] [2-(3-ethyl-4-keto-2-thio - 5 - oxazolidinylidene) - 3-methyl-4-thiazolid-5-one] dimethinemerocyanine

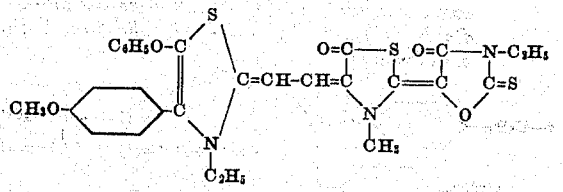

This dye was obtained as dark green needles, M. P. 233° C., from pyridine-methanol with a sensitizing maximum at 660 mu (AgClBr).

*Example 40.*—[4-p-anisyl-3-ethyl-5-phenoxy-2-thiazole] [2-(2-diphenylamino-4-keto - 5 - thiazolinylidene) - 3-methyl-4-thiazolid-5-one] dimethinemerocyanine

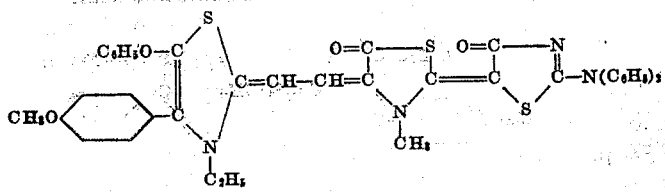

This dye was obtained as dark green needles, M. P. 193° C., from pyridine-methanol with sensitizing maxima at 650 mu (AgClBr and AgIBr).

*Example 41.*— [4-p-anisyl-3-methyl-5-p-(t-octyl)phenoxy-2-thiazole] [2-(3 - ethyl-4-keto-2-thio-5-thiazolidinylidene) - 3-ethyl-5-thiazolid-4-one] dimethinemerocyanine

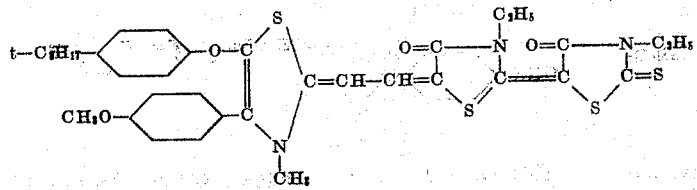

This dye was obtained as dark green needles, M. P. 252° C., from pyridine-methanol with a sensitizing maximum at 680 mu (AgClBr).

*Example 42.*—[4-p-anisyl-3-methyl-5 - p - (t-octyl)phenoxy - 2 - thiazole] [2-(3-ethyl-4-keto-2-thio-5-oxazolidinylidene)-3 - ethyl-5-thiazolid-4-one] dimethinemerocyanine

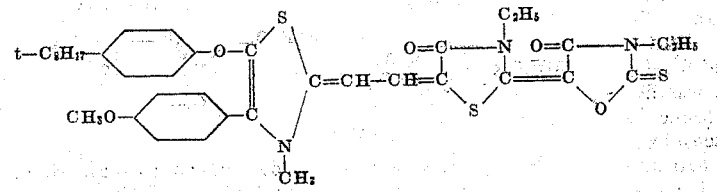

This dye was obtained as flat green needles, M. P. 201° C., from pyridine-methanol with a sensitzing maximum at 650 mu (AgClBr).

*Example 43.*—[4-p-anisyl-3-methyl-5-p - (t - octyl)phenoxy-2-thiazole] [2-(3 - ethyl-4-keto-2-thio-5-thiazolidinylidene)-3-methyl - 4 - thiazolid-5-one] dimethinemerocyanine

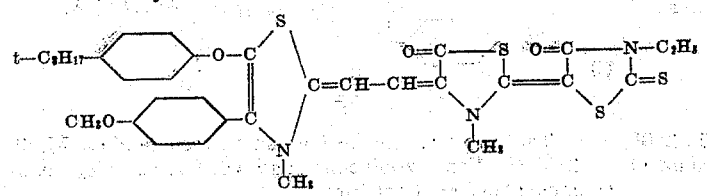

This dye was obtained as bright green flakes, M. P. 258° C., from pyridine-methanol with a sensitizing maximum at 670 mu (AgClBr).

*Example 44.*—[4-p-anisyl-3-methyl-5-p-(t - octyl)phenoxy-2-thiazole] [2-(3-ethyl-4-keto-2-thio - 5 - oxazolidinylidene) - 3 - methyl-4-thiazolid-5-one] dimethinemerocyanine

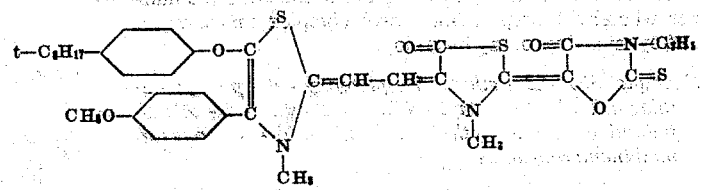

The dye was obtained as bright green needles, M. P. 248° C., from pyridine-methanol with a sensitizing maximum at 650 mu (AgClBr).

*Example 45.*—*[3-ethyl-5-p-chlorophenoxy - 4 - p-chlorophenyl-2-thiazole] [2-(3 - ethyl-4-keto-2-thio-thiazolidinylidene) - 3-ethyl - 5 - thiazolid-4-one] dimethinemerocyanine*

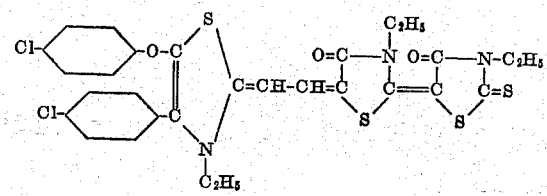

This dye was obtained as a green powder, M. P. 246° C., from pyridine-methanol with a sensitizing maximum at 650 mu (AgClBr).

*Example 46.*—*[3 - ethyl-5-p-chlorophenoxy-4-p - chlorophenyl-2-thiazole] [2-(3-ethyl-4-keto-2-thio - 5 - thiazolidinylidene)-3-methyl - 4 - thiazolid-5-one] dimethinemerocyanine*

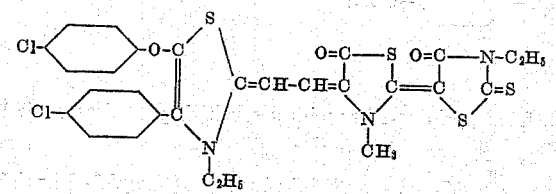

This dye was obtained as dark green needles, M. P. 275° C., from pyridine-methanol with sensitizing maxima at 665 mu (AgClBr) and 670 mu (AgIBr).

*Example 47.*—*[3-ethyl-5-p-bromophenoxy - 4 - p - bromophenyl-2-thiazole] [2-(3-ethyl-4-keto-2-thio - 5 - thiazolidinylidene)-3-methyl-4-thiazolid - 5 - one] dimethinemerocyanine*

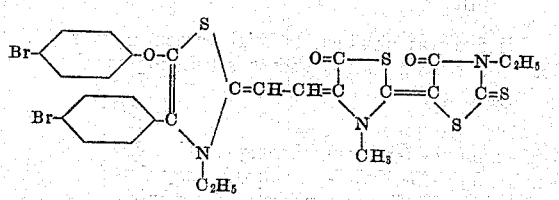

This dye was obtained as green threads, M. P. 286° C., from pyridine-methanol with sensitizing maxima at 670 mu (AgClBr and AgIBr).

*Example 48.*—*[3-ethyl - 4 - phenyl-5-p-tolylthio - 2 - thiazole] [2-(3 - ethyl-4-keto-2-thio - 5 - thiazolidinylidene)-3-ethyl - 5 - thiazolid-4-one] dimethinemerocyanine*

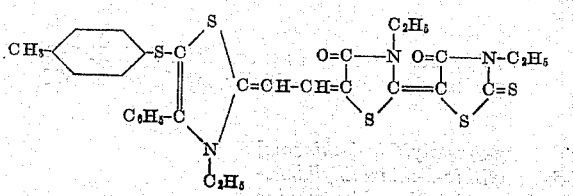

This dye was obtained as brown needles, M. P. 298° C., from pyridine-methanol with sensitizing maxima at 670 mu (AgClBr) and 660 mu (AgIBr).

*Example 49.*—*[3-ethyl-4-phenyl - 5 - p - tolylthio - 2 - thiazole] [2-(3-ethyl-4-keto-2-thio - 5 - thiazolidinylidene)-3-methyl-4-thiazolid - 5 - one] dimethinemerocyanine*

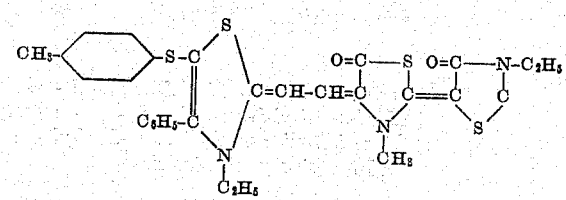

This dye was obtained as green needles, M. P. 224° C., from pyridine-methanol. It was sensitized a gelatino silver chlorobromide emulsion with maxima at 630 and 690 mu and a gelatine silver bromiodide emulsion with maxima at 630 and 690 mu.

*Example 50.*—*[3-ethyl-4-β-naphthyl - 5 - p - tolylthio - 2-thiazole] [2-(3 - ethyl-4-keto-2-thio - 5 - thiazolidinylidene)-3-ethyl-5-thiazolid - 4 - one] dimethinemerocyanine*

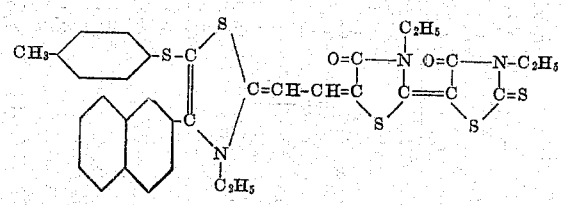

This dye was obtained as green needles, M. P. 247° C., from pyridine-methanol with a sensitizing maximum at 660 mu (AgClBr).

*Example 51.*—*[3-ethyl-4-β-naphthyl - 5 - p - tolylthio-2-thiazole] [2-(3 - ethyl-4-keto-2-thio - 5 - thiazolidinylidene)-3-methyl-4-thiazolid - 5 - one] dimethinemerocyanine*

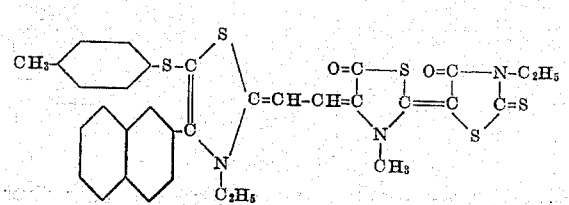

This dye was obtained as a violet powder, M. P. 296° C., from pyridine-methanol. It sensitized a gelatine silver chlorobromide emulsion with maxima at 630 and 680 mu.

*Example 52.*—*[4-p-anisyl-3-methyl - 5 - phenoxy-2-thiazole] [5-(4-p-anisyl-3-methyl - 5 - phenoxy-2-thiazolidinylideneethylidene)-3-ethylthiazol-4 - one] methinecyanine-p-toluenesulphonate*

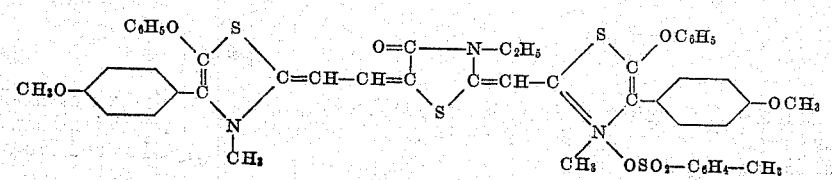

Product of Ex. 14 (1.3 g.) and methyl p-toluenesulphonate were fused at 120° C. for 1 hour. 4-p-anisyl-2-methyl-5-phenoxythiazole metho-p-toluenesulphonate (1.33 g.) was added with ethanol (10 cc.) and triethylamine (0.4 cc.) and the whole heated on the steam bath for 5 minutes. The blue dye crystallized completely on chilling. It was washed with ethanol and recrystalized from methanol as dark green needles, M. P. 266° C. It sensitized a silver chlorobromide emulsion with a peak at 660 mu.

*Example 53.*—[4-p-anisyl-3-ethyl - 5 - phenyl-2-thiazole] [5-(4-p-anisyl-3-methyl - 5 - p - (t-octyl)phenoxy-2-thiazolidinylideneethylidene)-3-ethyl - 2 - thiazol - 4-one] methinecyanine iodide

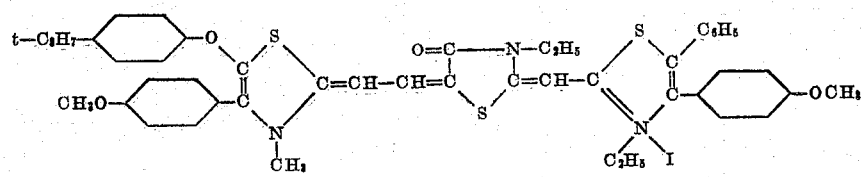

This dye was obtained as purple needles, M. P. 224° C., from pyridine-methanol with a sensitizing maximum at 650 mμ (AgClBr).

*Example 54* — [3 - methyl-5-phenoxy-4-phenyl-2-thiazole] [4-(3 - ethyl - 4,5 - benz - 2-benzothiazolinylideneethylidene) - 3 - methyl - 2 - thiazol-5-one]methinecyanine-p-toluenesulphonate

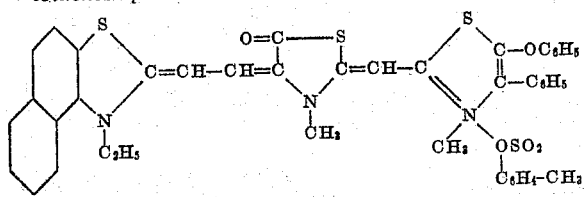

This dye was obtained as violet threads, M. P. 264° C., from pyridine-methanol. It sensitized a gelatino-silver chlorobromide emulsion with maxima at 630 and 690 mμ and a gelatino-silver bromiodide emulsion with maxima at 630 and 690 mμ.

*Example 55.*—[3 - methyl-5-phenoxy-4-phenyl-2-thiazole] [4 - (3 - ethyl - 2 - benzothiazolinylidene ethylidene)-3-methyl-2-thiazol-5-one]methinecyanine iodine

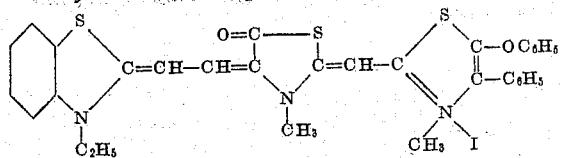

This dye was obtained as coppery threads, M. P. 242° C., from pyridine-ether with a sensitizing maxima at 660 mμ. (AgClBr and AgIBr).

*Example 56.*—[3 - methyl-5-phenoxy-4-phenyl-2-thiazole] [4 - (3 - ethyl - 2-benzoselenazolinylideneethylidene)-3-methyl-2-thiazol-5-one]methinecyanine iodide

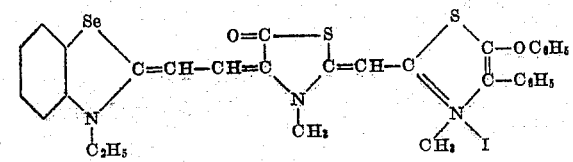

This dye was obtained as bright green crystals, M. P. 263° C., from pyridine with a sensitizing maximum at 670 mμ.

*Example 57.*—[3 - methyl - 5-p-bromophenoxy-4-p-bromophenyl - 2 - thiazole][4-(3-ethyl-5-p-bromophenoxy-4-p-bromophenyl-2-thiazolinylideneethylidene)-3-methyl-2-thiazol-5-one]methinecyanine iodide

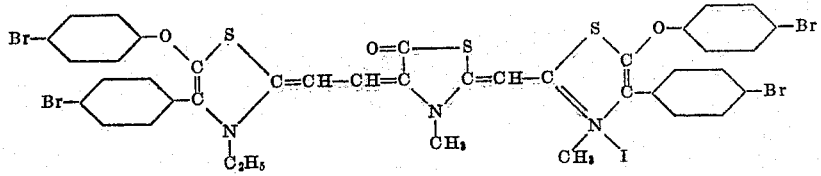

This dye was obtained as green flakes, M. P. 190° C., from methanol, with a sensitizing maximum at 670 mμ.

*Example 58.*—[3-methyl-4-phenyl-5-p-tolylthio-2-thiazole] [5 - (3 - ethyl - 4-phenyl-5-p-tolylthio-2-thiazolinylideneethylidene) - 3 - ethyl - 2 - thiazol-4-one]methinecyanine iodide

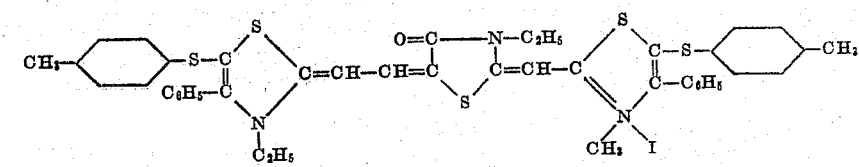

This dye was obtained as green needles, M. P. 233° C., from pyridine-ether, with sensitizing maxima at 660 mμ (AgClBr) and 670 mμ (AgIBr).

*Example 59.*—*[3-methyl-4-phenyl-5-p-tolylthio-2-thiazole] [4 - (3-methyl-4-phenyl-5-p-tolylthio-2-thiazolinylidene-ethylidene) - 3 - methyl-2-thiazol-5-one]methinecyanine iodide*

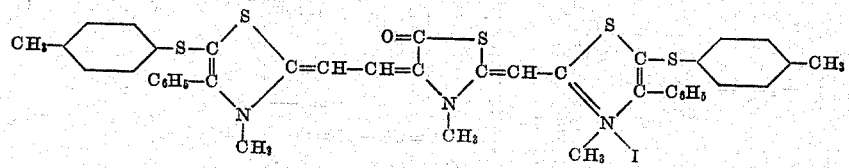

This dye was obtained as violet threads, M. P. 205° C., from pyridine-ether, with sensitizing maxima at 630 mμ (AgClBr) and (AgIBr) and 690 mμ (AgClBr and AgIBr).

*Example 60.*—*[3 - methyl - 4 - β-naphthyl-5-p-tolylthio-2-thiazole] [5-(3-ethyl-4-β-naphthyl-5-p-tolylthio-2-thiazolinylideneethylidene) - 3 - ethyl-2-thiazol-4-one]methinecyanine iodide*

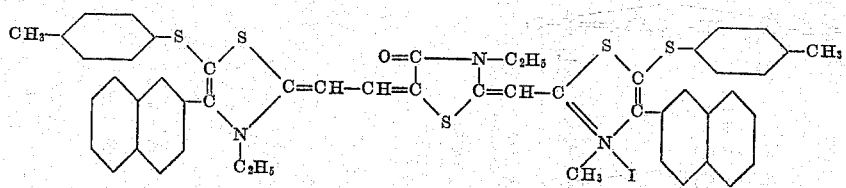

This dye was obtained as violet threads, M. P. 241° C., from pyridine-ether with a sensitizing maximum at 670 mμ (AgClBr).

*Example 61.*—*[3-methyl-4-β-naphthyl-5-p-tolylthio-2-thiazole] [4 - (3-methyl-4-β-naphthyl-5-p-tolylthio-2-thiazolinylideneethylidene)-3-methyl-2-thiazol-5-one]methinecyanine iodide*

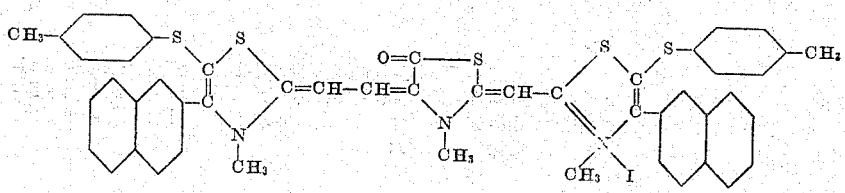

This dye was obtained as a bronze-violet powder, M. P. 222° C., from pyridine-ether with sensitizing maxima at 630 mμ (AgClBr) and 670 mμ (AgClBr).

The dyes of Examples 54, 55, and 56 were prepared by condensing the quaternized merocyanine dyes of Aubert, Jeffreys, and Knott U. S. application Serial No. 220,332, filed March 2, 1951, U. S. Patent 2,656,351, issued October 20, 1953 (see Example 10, for example) with the quaternary salts represented by Formula IV above. The condensations were effected in ethanol with triethylamine as the condensing agent. This type of process is described in detail in Serial No. 220,332. The dyes thus produced can be represented by the following general formula:

XVI.

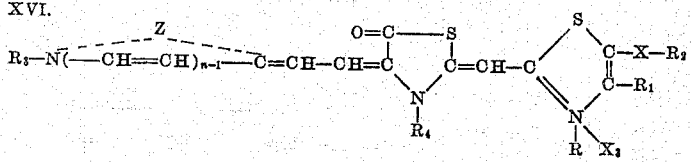

wherein R, $R_1$, $R_2$, $R_3$, $R_4$, $X_3$, X, n, and Z each have the values given above.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

What I claim as my invention and desired secured by Letters Patent of the United States is:

1. A polymethine dye selected from the group consisting of those represented by the following general formulas:

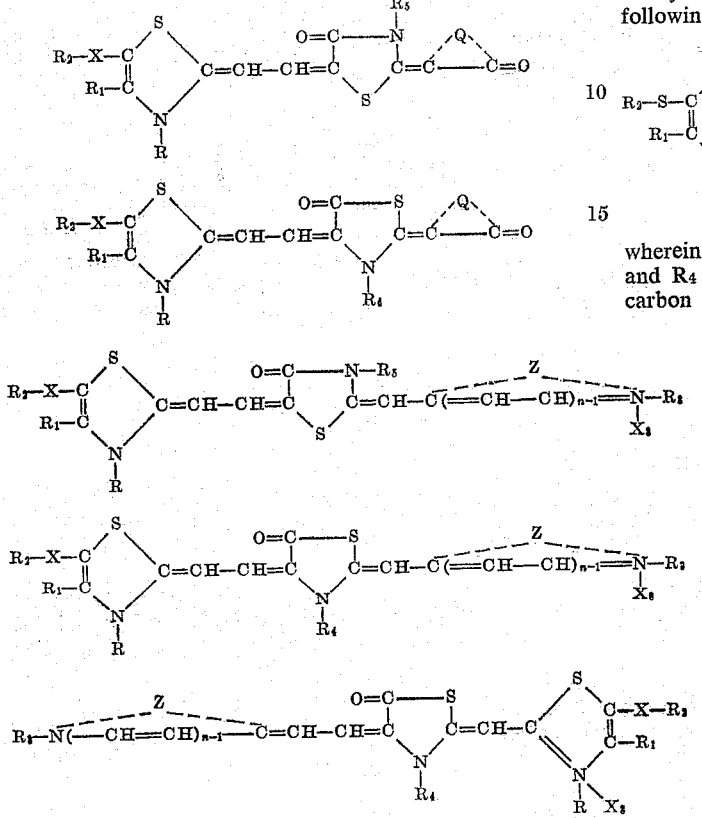

wherein R, $R_3$, $R_4$, and $R_5$ each represents an alkyl group containing from 1 to 2 carbon atoms, $R_1$ and $R_2$ each represents a monocyclic aryl group of the benzene series, X represents a member selected from the group consisting of an oxygen atom and a sulfur atom, Q represents the non-metallic atoms necessary to complete a heterocyclic nucleus containing 5 atoms in the heterocyclic ring, 3 of said atoms being carbon atoms, one of said atoms being a nitrogen atom, and 1 of said atoms being selected from the group consisting of an oxygen atom and a sulfur atom, $n$ represents a positive integer of from 1 to 2, $X_3$ represents an acid radical, Z represents the non-metallic atoms necessary to complete a heterocyclic nucleus selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, those of the 2-pyridine series, and those of the 4-pyridine series.

2. A [3-alkyl-4-aryl-5-arylthio-2-thiazole] [5-(3-alkyl-4 - aryl - 5 -arylthio - 2 - thiazolinylidene ethylidene) - 3 - alkyl - 2 - thiazol - 4 - one]methinecyanine dye having the following formula:

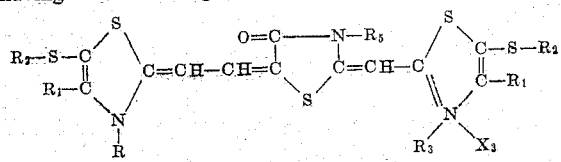

wherein $R_1$ and $R_2$ each represents an aryl group, R, $R_3$ and $R_5$ each represents an alkyl group of from 1 to 2 carbon atoms, and $X_3$ represents an acid radical.

3. A [3-alkyl-4-aryl-5-arylthio-2-thiazole] [4-(3-alkyl-4 - aryl - 5 - arylthio - 2 - thiazolinylidene ethylidene) - 3-alkyl-2-thiazol-5-one]methinecyanine dye having the following formula:

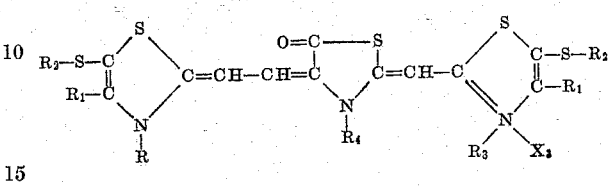

wherein $R_1$ and $R_2$ each represents an aryl group, R, $R_3$ and $R_4$ each represents an alkyl group of from 1 to 2 carbon atoms and $X_3$ represents an acid radical.

4. A [3-alkyl-5-aryloxy-4-aryl-2-thiazole] [2-(3-alkyl-4 - keto - 2 - thio - 5 - thiazolidinylidene) - 3 - alkyl - 5 - thiazolid-4-one]dimethinemerocyanine dye having the following formula:

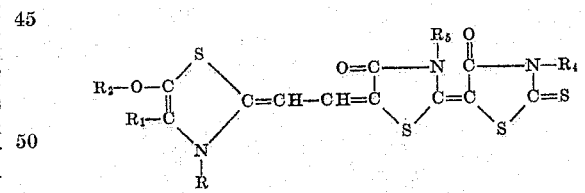

wherein $R_1$ and $R_2$ each represents an aryl group, and R, $R_4$ and $R_5$ each represents an alkyl group of from 1 to 2 carbon atoms.

5. A [3-alkyl-5-aryloxy-4-aryl-2-thiazole] [2-(3-alkyl-4 - keto - 2 - thio - 5 - thiazolidinylidene) - 3 - alkyl - 4 - thiazolid-5-one]dimethinemerocyanine dye having the following formula:

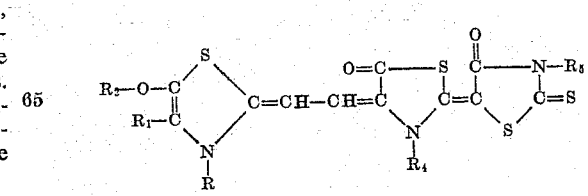

wherein $R_1$ and $R_2$ each represents an aryl group, and R, $R_4$ and $R_5$ each represents an alkyl group of from 1 to 2 carbon atoms.

6. A [3-alkyl-5-aryloxy-4-aryl-2-thiazole] [2-(3-alkyl-4 - keto - 2 - thio - 5 - oxazolidinylidene) - 3 - alkyl - thiazolid-4-one]dimethinemerocyanine dye having the following formula:

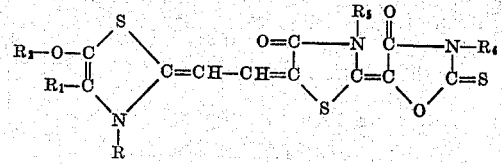

wherein $R_1$ and $R_2$ each represents an aryl group, and R, $R_4$ and $R_5$ each represents an alkyl group of from 1 to 2 carbon atoms.

7. A polymethine dye represented by the following formula:

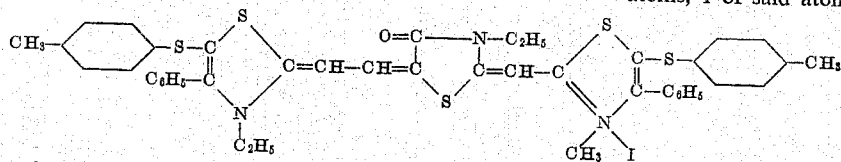

8. A polymethine dye represented by the following formula:

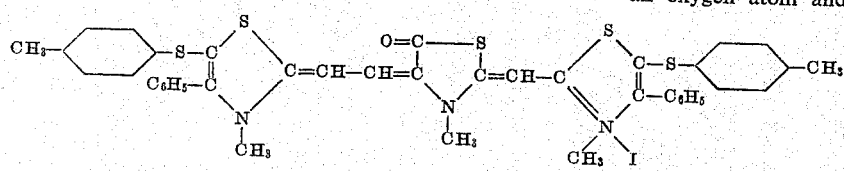

9. A polymethine dye represented by the following formula:

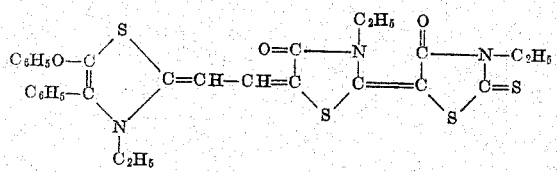

10. A polymethine dye represented by the following formula:

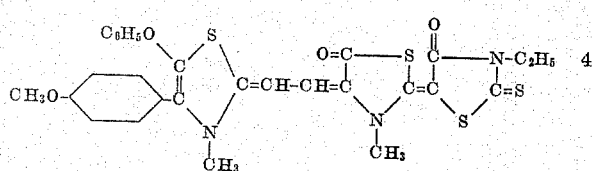

11. A polymethine dye represented by the following formula:

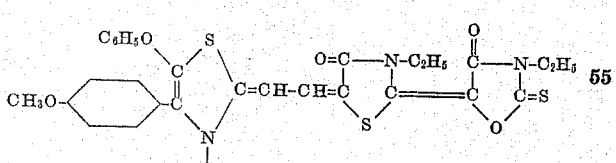

12. A process for preparing polymethine dyes comprising condensing a compound selected from those represented by the following general formula:

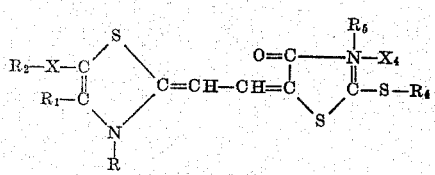

wherein R, $R_4$ and $R_5$ each represents an alkyl group containing from 1 to 2 carbon atoms, $R_1$ and $R_2$ each represents a monocyclic aryl group of the benzene series, X represents a member selected from the group consisting of an oxygen atom and a sulfur atom, and $X_4$ represents an acid radical, with a compound selected from those represented by the following general formulas:

and

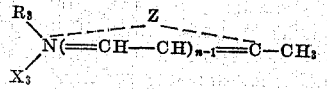

wherein Q represents the non-metallic atoms necessary to complete a heterocyclic nucleus containing 5 atoms in the heterocyclic ring, 3 of said atoms being carbon atoms, 1 of said atoms being a nitrogen atom, and 1 of said atoms being selected from the group consisting of an oxygen atom and a sulfur atom, $R_3$ represents an alkyl group, $X_3$ represents an acid radical, $n$ represents a positive integer of from 1 to 2, and Z represents the non-metallic atoms necessary to complete a heterocyclic nucleus selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, those of the 2-pyridine series, and those of the 4-pyridine series.

13. A process for preparing polymethine dyes comprising condensing a compound selected from those represented by the following general formula:

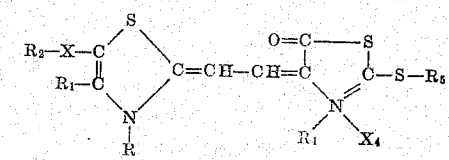

wherein R, $R_4$ and $R_5$ each represents an alkyl group containing from 1 to 2 carbon atoms, $R_1$ and $R_2$ each represents a monocyclic aryl group of the benzene series, X represents a member selected from the group consisting of any oxygen atom and a sulfur atom, and $X_4$ represents an acid radical, with a compound selected from those represented by the following general formulas:

and

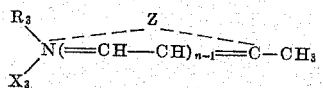

wherein Q represents the non-metallic atoms necessary to complete a heterocyclic nucleus containing 5 atoms in the heterocyclic ring, 3 of said atoms being carbon atoms, 1 of said atoms being a nitrogen atom, and 1 of said atoms being selected from the group consisting of an oxygen atom and a sulfur atom, $R_3$ represents an alkyl group, $X_3$ represents an acid radical, $n$ represents a positive integer of from 1 to 2, and Z represents the non-metallic atoms necessary to complete a heterocyclic nucleus selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, those of the 2-pyridine series, and those of the 4-pyridine series.

References Cited in the file of this patent

UNITED STATES PATENTS

| | | |
|---|---|---|
| 2,265,908 | Kendall | Dec. 9, 1941 |
| 2,656,351 | Per Aubert | Oct. 20, 1953 |